United States Patent (10) Patent No.: US 9,047,143 B2
Pruss et al. (45) Date of Patent: Jun. 2, 2015

(54) AUTOMATION AND PROGRAMMABILITY FOR SOFTWARE DEFINED NETWORKING SYSTEMS

(71) Applicant: CISCO TECHNOLOGY, INC., San Jose, CA (US)

(72) Inventors: Richard M. Pruss, Queensland (AU); John E. McDowall, Redwood City, CA (US); Jan Medved, Pleasanton, CA (US); Larry Abrahams, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 104 days.

(21) Appl. No.: 13/844,326

(22) Filed: Mar. 15, 2013

(65) Prior Publication Data
US 2014/0282628 A1 Sep. 18, 2014

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ...................................... *G06F 9/541* (2013.01)

(58) Field of Classification Search
None
See application file for complete search history.

(56) References Cited

U.S. PATENT DOCUMENTS

2012/0117228 A1* 5/2012 Gabriel et al. ................ 709/224
2014/0215036 A1* 7/2014 Elzur ............................ 709/223

* cited by examiner

*Primary Examiner* — H S Sough
*Assistant Examiner* — William C Wood
(74) *Attorney, Agent, or Firm* — Patterson + Sheridan, LLP (57) ABSTRACT

System, method, and computer program product to orchestrate software defined networking (SDN) applications, by providing a plurality of network elements in a network, each network element comprising a plurality of ingress interfaces, a plurality of egress interfaces, and a routing information base (RIB), providing, to an SDN application, an application program interface (API) to abstract properties and events of: (i) the ingress interfaces, (ii) the egress interfaces, and (iii) the RIB of a specified network element, receiving a request from the SDN application apply a function to the specified network element, the function specifying to modify: (i) a preprocessing operation on a data packet, (ii) the RIB, (iii) a post processing operation on the data packet, and (iv) the properties of the ingress interfaces, egress interfaces, and RIBs of the specified network element, and applying the function to the specified network element through the API.

24 Claims, 4 Drawing Sheets

AUTOMATION AND PROGRAMMABILITY FOR SOFTWARE DEFINED NETWORKING SYSTEMS

TECHNICAL FIELD

Embodiments presented in this disclosure generally relate to software defined networking (SDN) systems. More specifically, embodiments disclosed herein provide automation and programmability for SDN enabled networking systems.

BACKGROUND

Networks have not traditionally been programmable entities. Although some programming frameworks may be used to configure networks, the intelligence has always been in the framework, and not the network. It would be useful to put more programmability in each switch and router rather than in the framework, where network operations may be implemented as a series of operations that are reflected into the network hardware. As networks become more complex and the need for them to respond to external changes in near real-time, the current approach of configuring networks at individual devices becomes impractical.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Embodiments disclosed herein provide a method to orchestrate software defined networking (SDN) applications. This method may generally include providing a plurality of network elements in the software defined network, each of the plurality of network elements comprising a plurality of ingress interfaces, a plurality of egress interfaces, and a routing information base (RIB), providing, to an SDN application executing on a specified network element, an application program interface (API) to abstract properties and events of: (i) the ingress interfaces of the specified network element, (ii) the egress interfaces of the specified network element, and (iii) the RIB of the specified network element, receiving a request from the SDN application invoke a function of the API to apply the function to the specified network element, and applying the function to the specified network element through the API.

DESCRIPTION OF EXAMPLE EMBODIMENTS

Software defined networking (SDN) techniques disclosed herein allow a network, traditionally a static entity, to become more dynamic in nature. SDN opens networks to application developers, who may write applications to manage network elements and data flows passing through a network element, without requiring physical access to the network elements themselves. Thus, rather than a network element being a fixed-function "appliance," SDN considers network hardware to be part of a distributed computational system that can be manipulated by software. An application developer writing applications for an SDN may execute the application "in the network," which may include any device which processes data flows between computing systems, e.g., a switching or routing element connecting host systems to a network (and devices connecting one computing network to another), as well as other computing devices able to execute the application while connected to the network. The application may execute commands and apply functions to the network devices (and the data flows) remotely or locally on the network element itself. Using applications in an SDN, developers may manage networking functions of a network element, such as routing, quality of service (QoS), and bandwidth allocation, as well as manage performance and/or properties the network elements themselves. Additionally, different programming logic may be applied to different flows or packets in the same network topology, such that each network graph need not have its own instance of the SDN application.

Software-defined networking, in general, provides additional flexibility and solidarity relative to conventional networks. Using an SDN controller, which may be either centrally located or located on the respective network devices, a network administrator can configure the control plane and dictate how the network devices route data. For example, the network administrator may assign criteria or SDN rules that, when satisfied, instruct the network device to perform a specific action on the received packet—e.g., drop the packet, forward the packet to a particular network device, evaluate the packet using an application on the network device, and the like. In one embodiment, the SDN controller configures the routing table or forwarding table (i.e., forwarding information base) in a network device based on the criteria or SDN rules.

Embodiments disclosed herein allow user applications to manage and coordinate applications executing on a variety of network hardware devices, e.g., switches and routers in a data center. In one embodiment, application programming interfaces (APIs) abstract the specific implementation details of each network element from such applications. This common programming model allows network elements to be accessed and modified using SDN applications that use application program interfaces (APIs) which abstract system and network services common to all network elements.

After receiving a packet on an ingress port, a network device in the SDN enabled network may evaluate the packet to determine what action to take. The network devices may rely on the different headers of the packet—e.g., source and destination addresses, security group tag, MAC-layer priority value, VLAN ID, etc.—to determine the action. The network device may also perform deep packet inspection to determine what action is appropriate. By matching the packets to a packet field in a SDN rule, the network device is able to identify an action to take regarding the packet.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access the application programming interfaces (APIs) for network elements, or related data available in the cloud. An operator of a physical data center in the cloud providing cloud services may use the APIs to alter, control, or otherwise determine routing and forwarding controls for traffic generated by cloud customers (e.g., customers hosting virtual machine instances, networked by virtual networks) based on non-routing criteria relevant to the service provider. In such a case, the APIs could store modified routes and data related to the non-traditional routing criteria at a storage location in the cloud. Doing so allows a user to access this information from any computing system attached to a network connected to the cloud (e.g., the Internet).

Figure 1:
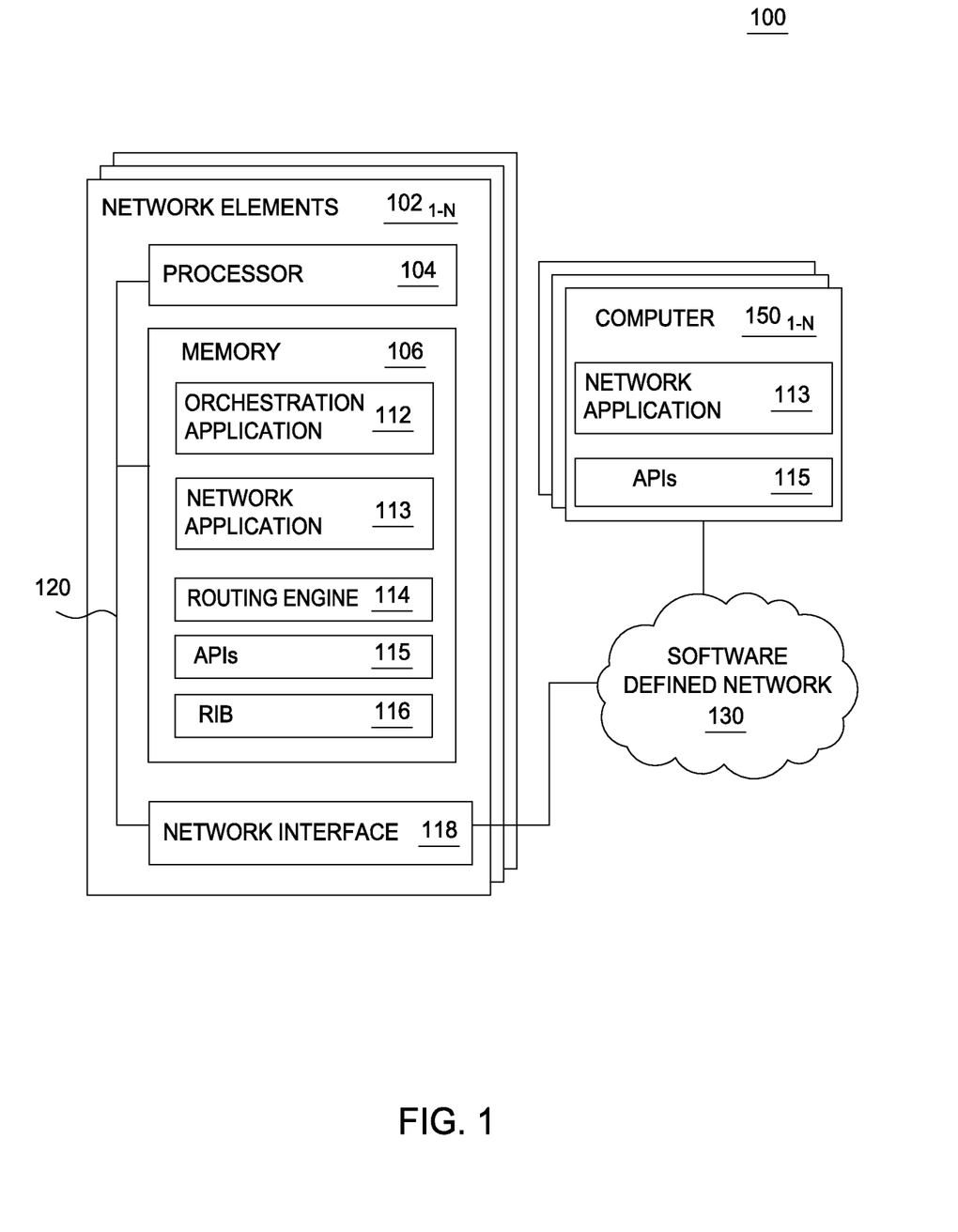
FIG. 1 illustrates a system for automation and programmability for software defined networking systems, according to one embodiment disclosed herein.

FIG. 1 illustrates a system 100 system for automation and programmability for SDN enabled networking systems, according to one embodiment disclosed herein. As shown, a plurality of network elements $102_{1-N}$ are connected via a SDN enabled network 130. A plurality of computers $150_{1-N}$ are also connected to the network elements $102_{1-N}$ through the SDN enabled network 130. In general, the SDN enabled network 130 may be a telecommunications network and/or a wide area network (WAN). In a particular embodiment, the SDN enabled network 130 is the Internet.

The network elements $102_{1-N}$ generally include a processor 104 connected via a bus 120 to a memory 106, and a network interface device 118. The network elements $102_{1-N}$ are configured to execute containerized software applications, such as the networking application 113. The network elements $102_{1-N}$ are generally under the control of an operating system (not shown). Examples of operating systems include the UNIX® operating system, distributions of the Linux® operating system, and the IOS operating system by Cisco Systems®. The processor 104 is included to be representative of a single CPU, multiple CPUs, a single CPU having multiple processing cores, and the like. The processor 104 may execute software developed for the purposes of embodiments disclosed herein. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the network elements $102_{1-N}$ to communicate with other network elements $102_{1-N}$ and computers $150_{1-N}$ via the SDN enabled network 130.

As shown, the memory 106 contains an orchestration application 112, which is an application generally configured to orchestrate automation and programmability of the network elements $102_{1-N}$ in the SDN enabled network 130. Generally, the orchestration application 112 is an interface to a plurality of APIs 115 used to abstract the implementation specific details of the network elements $102_{1-N}$ in the SDN enabled network 130. Stated differently, the APIs 115 of the orchestration application 112 are abstraction tools that permits a programmer or network administrator to access and monitor different functions and outputs of network elements $102_{1-N}$ in the SDN enabled network 130. By using the orchestration application 112 and the APIs 115, functional programming techniques may be used to program a wide range of network elements $102_{1-N}$, regardless of the wide array of distinctions found between specific network elements $102_{1-N}$. In particular, the orchestration application 112 may provide an interface to allow an application, such as the networking application 113, to read, write and modify the routing table and routing engine 113 of a network element $102_{1-N}$.

The memory 106 also contains a networking application 113, which may be any application configured to inspect or modify the networking capabilities, attributes, and functionalities of the network elements 102, as well as the data flows passing through them. For example, the networking application 113 may invoke functions provided by the APIs 115, to return attributes and functionalities from a network element $102_{1-N}$ and issue commands through the APIs 115 to apply functions to change the attributes and routing functionalities of the network element $102_{1-N}$. Additionally, the networking application 113 may modify the functionality of the network element $102_{1-N}$, e.g., to manipulate the forwarding and processing of data flows in the network element $102_{1-N}$. For example, the networking application 113 may use the APIs 115, provided by the orchestration application 112, to modify the RIB 116 and routing engine 114 of the network elements $102_{1-N}$.

The network elements $102_{1-N}$ in the SDN enabled network 130 may be any networking device such as a router, switch, bridge, etc. More generally, each network element $102_{1-N}$ provides computing hardware used to forward, route, or otherwise process network data (e.g., packets and frames) as it flows from one host to another. Each network element $102_{1-N}$ may run an operating system tailored to the particular hardware or networking functions of that networking element. At the same time, disparate network elements $102_{1-N}$ execute the orchestration application 112 and provide the APIs 115 in order to allow different types of functions to be applied consistently by the networking application 113. The routing engine 114 of the network elements $102_{1-N}$ is an application generally configured to execute the core networking functions of the respective network element. The routing engine 114 may interact with the routing information base (RIB) 116, also referred to as a routing table, which specifies a plurality of rules used by the routing engine 114 to route packets received on an ingress port (not shown) of the network elements $102_{1-N}$ to a proper egress port (not shown) of the network elements $102_{1-N}$. In one embodiment, the RIB 116 of each respective network element $102_{1-N}$ includes immediate topology information of the SDN enabled network 130, i.e., what other network elements a respective network element is connected to, and so on.

As shown, the memory 106 also contains the application programming interfaces (APIs) 115, which stores the APIs provided by the orchestration application 112 to the networking application 113. In one embodiment, the APIs 115 are an integrated component of the orchestration application 112 or the networking application 113. The APIs 115 abstract and provide data associated with the different functions of the network elements $102_{1-N}$, such as statistics associated with the network element, their routing tables, a status of the network elements, topology information, errors, and the like. Moreover, APIs 115 may also permit a programmer or network administrator to control the functions of the network elements $102_{1-N}$ such as change settings in the forwarding engine, change the state of the network elements $102_{1-N}$, etc. An application such as the networking application 113 may use the APIs 115 to send commands to access data from and apply functions to the network elements $102_{1-N}$.

The networking application 113 may invoke APIs 115 supported by the orchestration application 112 to read and modify the RIB 116 as well as the decisions made by the routing engine 114 in routing packets. In addition, the networking application 113 may read the RIB 116 to determine where the routing engine 114 routes a given packet. Furthermore, the networking application 113 may read and modify preprocessing and post processing operations performed on data packets flowing through the network elements $102_{1-N}$. Attributes, properties, and events of the network elements $102_{1-N}$ and their respective interfaces may be provided to the networking application 113 by the orchestration application 112 through one or more APIs 115. Likewise, these attributes, properties, and events may be modified by the networking application 113 using the APIs 115 provided by the orchestration application 112.

The computers $150_{1-N}$ may be capable of executing applications, such as the networking application 113, which may utilize the APIs 115 provided by the orchestration application 112. Therefore, in one embodiment, the orchestration application 112, the networking application 113, as well as other user applications, may be executed on one or more of the computers $150_{1-N}$ in order to modify the routing behavior (or any behavior) of some or all of the network elements $102_{1-N}$. In still another embodiment, the computers $150_{1-N}$ may be blade servers which execute the networking application 113 in the SDN enabled network 130.

Figure 2:
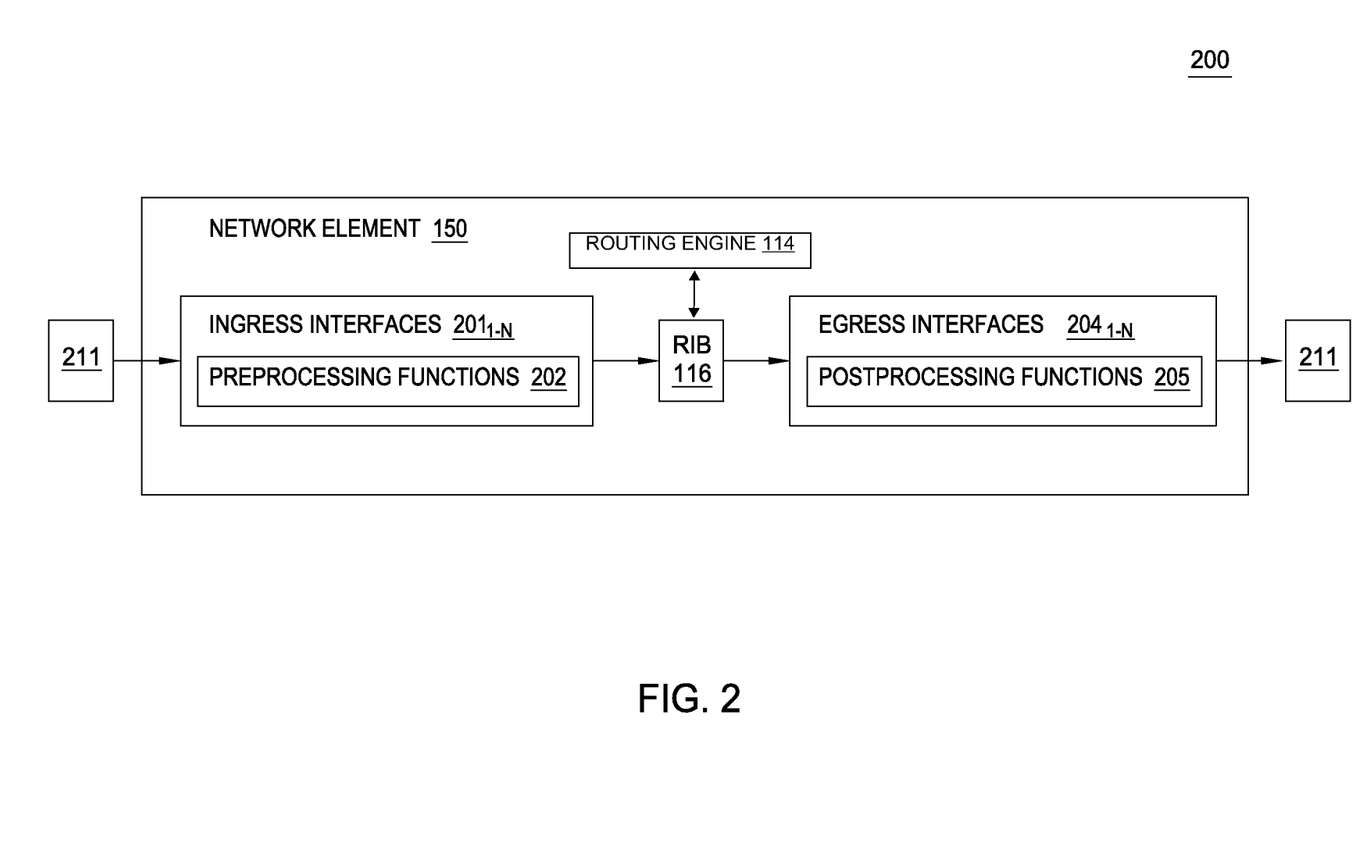
FIG. 2 illustrates a view of a network element implementing automation and programmability in a SDN enabled networking system, according to one embodiment disclosed herein.

FIG. 2 illustrates a view 200 of a network element 102 implementing automation and programmability in a SDN enabled networking system, according to one embodiment disclosed herein. As shown, the network element 102 includes ingress interfaces $201_{1-N}$, and an egress interfaces $204_{1-N}$. The ingress interfaces $201_{1-N}$ and egress interfaces $204_{1-N}$ may be physical interfaces that connect the network element 102 to one or more upstream or downstream network elements. The ingress interfaces $201_{1-N}$ and egress interfaces $204_{1-N}$ may each have attributes, statuses, and properties such as link states, connected upstream and downstream devices. This information may be provided to the network application 113 by the APIs 115 of the orchestration application 112.

When one of the ingress interfaces 201 receives a data packet (or frame) 211, a designated component of the network element 102 may apply a respective set of preprocessing functions 202 to the data packet 211. The preprocessing functions 202 may be any type of networking function, such as dropping packets based on predefined logic, applying a quality of service (QoS) function, DHCP rules, logging events, authentication, authorization and accounting (AAA) protocols, deep packet inspection, formatting, reordering, queuing, tagging, modifying destination IP addresses, or a custom networking function based on rules defined by an application programmer. The rules may orchestrate several components of the network element 102 to perform the preprocessing functions 202, which may be applied across several network elements.

In one embodiment, an application, such as the networking application 113, may read and write attributes and events of the ingress interfaces $201_{1-N}$ using the APIs 115 provided by the orchestration application 112. For example, the APIs 115 may return properties, statuses, link information, and other attributes of the ingress interfaces $201_{1-N}$, which the networking application 113 can then modify. Additionally, the networking application 113 may read, write, modify, delete, and add functions to the preprocessing functions 202. For example, the networking application 113 may trigger the application of QoS while preprocessing some packets, and include deep packet inspection while preprocessing other packets. As another example, the networking application 113 may modify the QoS of different packets by directing an input filter of the ingress interfaces $201_{1-N}$ to identify a particular set of packets, such as those belonging to a particular user or application, and modify the priority of the packets when detected.

Once the network element 102 preprocesses the data packet 211, the routing engine 114 determines where to route the data packet 211 based on information contained in the routing information base (RIB) 116. The RIB 116 may implement routing rules, including but not limited to Open Shortest Path First (OSPF), Intermediate System to Intermediate System (IS-IS), and Enhanced Interior Gateway Routing Protocol (EIGRP) to determine which egress interface $204_{1-N}$ the data packet 211 should be forwarded through in order to reach its appropriate destination.

A programmer may develop applications (i.e., the networking application 113) to read, write, modify, and override the rules in the RIB 116. In one embodiment, to do so, the programmer may invoke the APIs 115 provided by the orchestration application 112. For example, the networking application 113 may examine the RIB 116, and determine that the data packet 211 may reach its destination by being forwarded out of egress interface $204_3$. However, the networking application 113 may have determined, as part of the preprocessing functions 202 that the data packet 211 belongs to a particular class of applications whose packets should be diverted to a server for further processing prior to being forwarded towards a destination. The networking application 113 may use the APIs 115 of the orchestration application 112 to identify the properties of the egress interfaces $204_{1-N}$ in order to determine that egress interface $204_2$ is connected to the server. Alternatively, the networking application 113 may use the RIB 116 to determine that a packet destined for the server should use egress interface $204_2$. The networking application 113 may then override the decision to forward the packet through egress interface $204_3$, and instead forward the packet through egress interface $204_2$ such that it is sent to the server for further processing.

Once the routing decision has been made by the routing engine 114, a plurality of post processing functions 205 may be applied to the data packet 211 by a designated component of the network element 102 before it is forwarded via the appropriate egress interface $204_{1-N}$. The post processing functions 202 may be any type of networking function, such as dropping packets based on predefined logic, applying a quality of service (QoS) function, DHCP rules, logging events, authentication, authorization and accounting (AAA) protocols, deep packet inspection, formatting, reordering, queuing, tagging, modifying destination IP addresses, or a custom networking function based on rules defined by an application programmer. The rules may orchestrate several components of the network element 102 to perform the post processing functions 205, which may be applied across several network elements.

Embodiments disclosed herein allow an application, such as the networking application 113, to read and write attributes and events of the egress interfaces $204_{1-N}$ by using the APIs 115 provided by the orchestration application 112. For example, the APIs 115 may return properties, statuses, link information, and any other attributes of the egress interfaces $204_{1-N}$, which may then be modified by the networking application 113. Additionally, the networking application may read, write, modify, delete, and add functions to the post processing functions 205. For example, the networking application 113 may drop packets that meet predefined criteria, or change the egress port $204_{1-N}$ through which one or more packets is routed.

Advantageously, any networking operation may be performed on the network element 102 and the components thereof using the APIs 115 provided by the orchestration application 112. The APIs 115 also allow an application, such as the networking application 113, to read and write any attribute, capability, status, or any value of the network element 102 and the components thereof, regardless of whether the application executes on the network element 102, or an external computing device.

Figure 3:
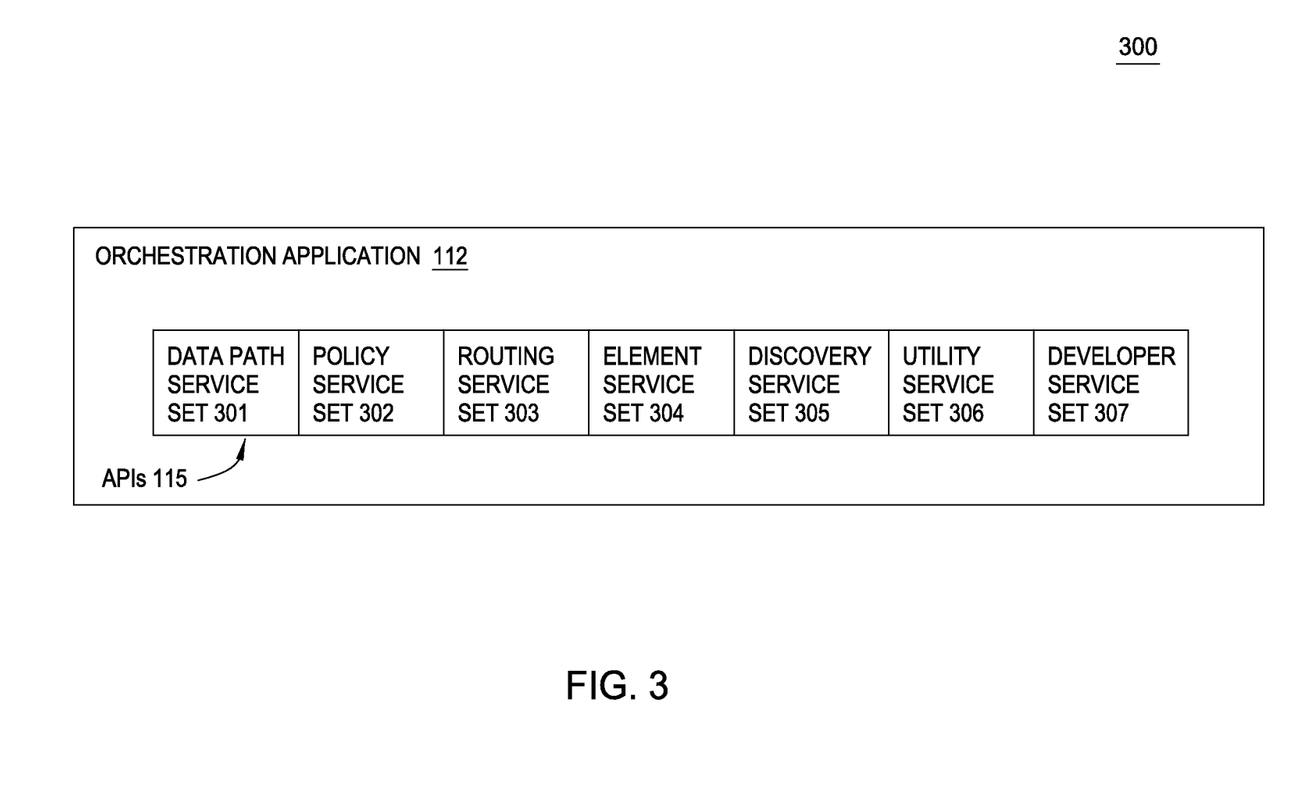
FIG. 3 illustrates a logical view of the application programming interfaces of an orchestration application to provide automation and programmability for SDN enabled networking systems, according to one embodiment disclosed herein.

FIG. 3 illustrates a logical view 300 of the application programming interfaces 115 of the orchestration application 112, according to one embodiment. As shown, the APIs 115 have been grouped into a plurality of service sets, including a data path service set 301, a policy service set 302, a routing service set 303, an element service set 304, a discovery service set 305, a utility service set 306, and a developer service set 307. For the sake of clarity, each service set 301-307 is briefly defined in Table I:

TABLE I

| Service Set | Description |
| --- | --- |
| Data Path | Provides packet delivery service to application (copy, punt inject) |
| Policy | Provides filtering (NBAR, ACL), classification (class-maps, policy-maps), actions (marking, policing, queuing, copy, punt), and applies policies to interfaces on network elements |
| Routing | Read routing information base (RIB) routes, add/remove routes, receive RIB notifications |
| Element | Provide element properties, CPU/memory statistics, network interfaces, element and interface events |
| Discovery | Provides L3 topology and local service discovery |
| Utility | Provide syslog events notification, path tracing capabilities (ingress/egress and interface stats, next-hop info, etc) |
| Developer | Debug capability, command line interface (CLI) extension allowing applications to extend/integrate application's CLIs with network element |

The service sets 301-307 provide a set of base network services that allow application developers to run existing applications that run on any platform within a container and discover other services and network resources. The network services may be the common APIs that applications, such as the networking application 113, code to. The APIs 115 may be the same for all implementations of the network element providing the underlying network functionality. A network service may be made available to the developer's application in the language and programming of model of choice by the service presentation function of the orchestration application 112. The layer below the application presentation library may be an application communication library, which may act as the client for transporting network services from the network element. A service set 301-307 may be derived from one or more network element features, and may require one or more feature APIs. The implementation of a network service from these feature APIs occurs within a network element abstraction library of the orchestration application 112. The layer below the abstraction library is the network element communication library of the orchestration application 112, which may act as the server for transporting the network service to one or more network applications, such as the network application 113, requiring the service.

The data path service set 301 may provide APIs that allow an application developer to hook into the packet flow of a network element, such as a switch or a router, and extract packets from that flow of packets. These packets may either be copied from the data path to an application, such as the networking application 113, or they may be punted or diverted to the networking application 113. When a packet is punted, it does not continue to its destination until the application returns it to the data path, possible modified. When copied, a copy of the packet continues to its destination, while the other is sent to the application.

The policy service set 302 may be a QoS policy service set, which allows requesting applications to apply a QoS policy to a network element. A policy is a mechanism to detect packets with specific attributes, such as a specific SCP value, and then apply a QoS action, such as priority queuing, to those packets.

The routing service set 303 may provide APIs allow access to the RIB of network elements, route up/down support, and the application route table. The element service set 304 may return capabilities and attributes of a network element. The capabilities of network elements may be specific network functions which may be performed by each respective network element, including, but not limited to, routing, firewall, Quality of Service (QoS), deep packet inspection, encryption, and compression. The attributes of a network element may include, but are not limited to, hardware components, operating systems, physical location, states, interfaces, interface attributes, element and interface events, and the like. In one embodiment, an element service set may be provided, which returns the network element properties. An application requesting information, such as the networking application 113, would connect to a given network element, and the session would be managed by the element service set 304. Once the networking application 113 is authenticated and authorized, it may access the network element information and other provided service sets.

Examples of specific services provided by the element service set 304 include the ability to provide information representing the hardware that hosts the network element's operating system, and providing services to requesting applications. The element service set 304 may also provide static attributes of the network element, which may be cached, and dynamic attributes of the network elements that may be retrieved on demand to reflect the latest network element status. Example attributes include a textual description of the network element, which indicates the full name and version identification of the network element's hardware type, software operating system, and networking software. Additionally, the description may include an administratively assigned name for the network element, and a time since the network element was last restarted. Process information about the network element may also be returned, such as CPU and memory status, which indicate the processes running on the network elements.

The element service set 304 may also provide introspection into network element interfaces and ports, by providing an abstraction for virtual and/or physical interfaces on a network element. The element service set 304 may provide information related to interface attributes, including, but not limited to, a static property, configuration, dynamic status, and packet statistics of the network interface. Additionally, an application using the element service set 304 may register for network interface events, such as CDP (Cisco Discovery Protocol) events, filtering criteria, and state events.

The discovery service set 305 may provide a mechanism for an application to discover remote or local network elements, a network topology, and network elements providing common services. The discovery mechanism may be dynamic or static. The discovery service set interface may use a discovery protocol, such as CDP, on the network element or from the requesting application itself. In either case, information returned to the application will be the same, with the source of the information being the only difference. In the case of a remote discovery, the event source may be the name of the network element, and in the case of application discovery, the event source may be the application name.

The utility service set 306 may provide an interface to perform authentication, authorization, and accounting (AAA) for users using standard RADIUS/TACACS+ protocols without requiring an AAA client that understands these protocols. The utility service set 306 may also allow applications to register for notifications of events. A developer service set may provide interfaces to set, unset, and query a logging level, audit trails, a tracing interface, and a management interface. The developer service set 307 may provide interfaces to set, unset, and query a logging level, audit trails, a tracing interface, and a management interface.

Figure 4:
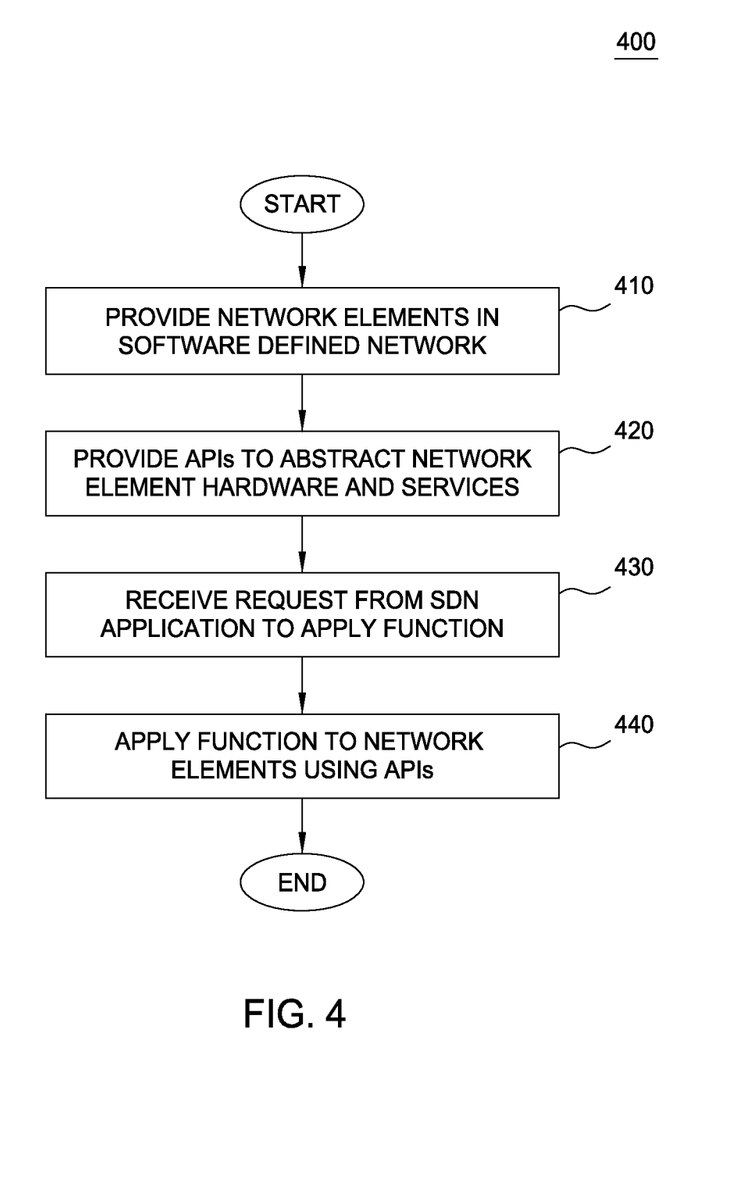
FIG. 4 is a flow chart depicting a method for automation and programmability for SDN enabled networking systems, according to one embodiment disclosed herein.

FIG. 4 is a flow chart depicting a method 400 for automation and programmability for SDN enabled networking systems, according to one embodiment disclosed herein. Generally, method 400 provides a plurality of application programming interfaces (APIs) that allow developers to apply programming techniques to network elements. That is, the APIs allow a developer to compose SDN applications that control SDN enabled network elements, without being tied to the particular network elements used to construct a data communication network. At step 410, network elements are provided in a SDN enabled network. At step 420, APIs are defined to abstract network element hardware and services. The APIs may allow an application to read, write, create, delete, and otherwise modify attributes, properties, capabilities, or functions of a network element. At step 430, an application issues a request to invoke a function of the APIs to apply the function to the specified network element. The request may seek an attribute of the network element, a capability of the network element, or interface properties of the network element. For example, an SDN application executing on the network may invoke the APIs to return an uptime of the network element. Alternatively, the device may be queried as to whether it supports QoS. Still yet, the network element may be asked to return its local L2 and L3 link state information for one or all of its interfaces. At step 440, the function is applied to the network element through the APIs. Continuing with the above example, a first network element running a first operating system may indicate that it has been active for 3 days, 2 hours, and 1 minute, that it does not support QoS, and that it is connected to a router via its lone active interface. A second network element, running a second operating system, may indicate that it has been active for 2 weeks, 1 day, and 3 seconds, that it supports QoS, and is a router connected to an upstream router and 5 downstream workstations. In addition, the requests may specify to modify different aspects of the network element, such as routing logic, attributes, preprocessing functions, and post processing functions. For example, the routing tables may be modified to change the way a particular user's or application's packets are routed. Preprocessing and post processing functions may be defined, added, modified, and removed.

Advantageously, embodiments disclosed herein provide abstractions which allows for the programming and management of a wide range of network elements, regardless of the underlying implementation thereof.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer implemented method to orchestrate software defined networking (SDN) applications, the method comprising:
   providing a plurality of network elements in a network, each of the plurality of network elements comprising a plurality of ingress interfaces, a plurality of egress interfaces, and a routing information base (RIB);
   providing, to an SDN application executing on a specified network element, of the plurality of network elements, an application program interface (API) to abstract properties and events of: (i) the ingress interfaces of the specified network element, (ii) the egress interfaces of the specified network element, and (iii) the RIB of the specified network element;
   receiving a request from the SDN application invoke a function of the API to apply the function to the specified network element; and
   applying the function to the specified network element through the API.

2. The method of claim 1, wherein modifying the RIB of the specified network element comprises overriding a routing logic in the RIB to route the data packet.

3. The method of claim 2, wherein the API is of a plurality of APIs, wherein each of the plurality of APIs belongs to a respective service set of a plurality of service sets, wherein each of the plurality of network elements executes a distinct operating system selected from a plurality of operating systems, wherein the routing logic specifies to forward the data packet through a first one of the plurality of egress interfaces, wherein the modified routing logic specifies to forward the data packet through a second one of the plurality of egress interfaces of the specified network element.

4. The method of claim 1, wherein the function specifies to independently modify each of: (i) a preprocessing operation on a data packet performed by the ingress interfaces of the specified network element, (ii) the RIB of the specified network element, (iii) a post processing operation on the data packet performed by the egress interfaces of the specified network element, and (iv) at least one of the properties of at least one of the ingress interfaces, egress interfaces, and RIBs of the specified network element.

5. The method of claim 4, wherein the preprocessing operation and the post processing operation comprise applying at least one networking function to the data packet.

6. The method of claim 5, wherein modifying a selected one of the preprocessing operation and the post processing operation comprises each of: (i) adding a new network function of the selected one of the preprocessing operation and the post processing operation, (ii) removing an existing network function from the selected one of the preprocessing operation and the post processing operation, and (iii) modifying the existing network function of the selected one of the preprocessing operation and the post processing operation.

7. The method of claim 1, wherein the SDN application is executed by each of the plurality of network elements, wherein the APIs are provided by each of the plurality of network elements.

8. The method of claim 1, wherein the SDN application is executed by a computing device external to the specified network element and communicably coupled to the network, wherein the computing device is not a network element.

9. A system, comprising:
one or more computer processors; and
a memory containing a program, which when executed by the one or more computer processors, performs an operation to orchestrate software defined networking (SDN) applications, the operation comprising:
providing a plurality of network elements in a network, each of the plurality of network elements comprising a plurality of ingress interfaces, a plurality of egress interfaces, and a routing information base (RIB);
providing, to an SDN application executing on a specified network element, of the plurality of network elements, an application program interface (API) to abstract properties and events of: (i) the ingress interfaces of the specified network element, (ii) the egress interfaces of the specified network element, and (iii) the RIB of the specified network element;
receiving a request from the SDN application invoke a function of the API to apply the function to the specified network element; and
applying the function to the specified network element through the API.

10. The system of claim 9, wherein modifying the RIB of the specified network element comprises overriding a routing logic in the RIB to route the data packet.

11. The system of claim 10, wherein the API is of a plurality of APIs, wherein each of the plurality of APIs belongs to a respective service set of a plurality of service sets, wherein each of the plurality of network elements executes a distinct operating system selected from a plurality of operating systems, wherein the routing logic specifies to forward the data packet through a first one of the plurality of egress interfaces, wherein the modified routing logic specifies to forward the data packet through a second one of the plurality of egress interfaces of the specified network element.

12. The system of claim 9, wherein the function specifies to independently modify each of: (i) a preprocessing operation on a data packet performed by the ingress interfaces of the specified network element, (ii) the RIB of the specified network element, (iii) a post processing operation on the data packet performed by the egress interfaces of the specified network element, and (iv) at least one of the properties of at least one of the ingress interfaces, egress interfaces, and RIBs of the specified network element.

13. The system of claim 12, wherein the preprocessing operation and the post processing operation comprise applying at least one networking function to the data packet.

14. The system of claim 13, wherein modifying a selected one of the preprocessing operation and the post processing operation comprises each of: (i) adding a new network function of the selected one of the preprocessing operation and the post processing operation, (ii) removing an existing network function from the selected one of the preprocessing operation and the post processing operation, and (iii) modifying the existing network function of the selected one of the preprocessing operation and the post processing operation.

15. The system of claim 9, wherein the SDN application is executed by each of the plurality of network elements, wherein the APIs are provided by each of the plurality of network elements.

16. The system of claim 9, wherein the SDN application is executed by a computing device external to the specified network element and communicably coupled to the network, wherein the computing device is not a network element.

17. A computer program product to orchestrate software defined networking (SDN) applications, comprising:
a non-transitory computer-readable storage medium having computer-readable program code embedded therewith, the computer-readable program code comprising:
computer-readable program code configured to provide a plurality of network elements in a network, each of the plurality of network elements comprising a plurality of ingress interfaces, a plurality of egress interfaces, and a routing information base (RIB);
computer-readable program code configured to provide, to an SDN application executing on a specified network element, of the plurality of network elements, an application program interface (API) to abstract properties and events of: (i) the ingress interfaces of the specified network element, (ii) the egress interfaces of the specified network element, and (iii) the RIB of the specified network element;
computer-readable program code configured to receive a request from the SDN application invoke a function of the API to apply the function to the specified network element; and
computer-readable program code configured to apply the function to the specified network element through the API.

18. The computer program product of claim 17, wherein modifying the RIB of the specified network element comprises overriding a routing logic in the RIB to route the data packet.

19. The computer program product of claim 18, wherein the API is of a plurality of APIs, wherein each of the plurality of APIs belongs to a respective service set of a plurality of service sets, wherein each of the plurality of network elements executes a distinct operating system selected from a plurality of operating systems, wherein the routing logic specifies to forward the data packet through a first one of the plurality of egress interfaces, wherein the modified routing logic specifies to forward the data packet through a second one of the plurality of egress interfaces of the specified network element.

20. The computer program product of claim 19, wherein the function specifies to independently modify each of: (i) a preprocessing operation on a data packet performed by the ingress interfaces of the specified network element, (ii) the RIB of the specified network element, (iii) a post processing operation on the data packet performed by the egress interfaces of the specified network element, and (iv) at least one of the properties of at least one of the ingress interfaces, egress interfaces, and RIBs of the specified network element.

21. The computer program product of claim 20, wherein the preprocessing operation and the post processing operation comprise applying at least one networking function to the data packet.

22. The computer program product of claim 21, wherein modifying a selected one of the preprocessing operation and the post processing operation comprises each of: (i) adding a new network function of the selected one of the preprocessing operation and the post processing operation, (ii) removing an existing network function from the selected one of the preprocessing operation and the post processing operation, and (iii) modifying the existing network function of the selected one of the preprocessing operation and the post processing operation.

23. The computer program product of claim 17, wherein the SDN application is executed by each of the plurality of network elements, wherein the APIs are provided by each of the plurality of network elements.

24. The computer program product of claim 17, wherein the SDN application is executed by a computing device external to the specified network element and communicably coupled to the network, wherein the computing device is not a network element.

* * * * *